United States Patent [19]
Kruger et al.

[11] Patent Number: 5,268,207
[45] Date of Patent: Dec. 7, 1993

[54] TEXTURING THE SURFACE OF A RECORDING DISK USING PARTICLE IMPACT

[75] Inventors: Bruce P. Kruger; Thomas S. Petersen; Steven F. Starcke, all of Rochester, Minn.

[73] Assignee: International Business Machines Corporation, Armonk, N.Y.

[21] Appl. No.: 632,286

[22] Filed: Dec. 21, 1990

[51] Int. Cl.$^5$ .......................... B05D 3/12; B05D 5/12
[52] U.S. Cl. .................................. 427/560; 427/129; 427/130; 427/132; 427/322; 427/327; 427/328; 427/444; 427/600
[58] Field of Search ................. 427/130, 57, 322, 327, 427/560, 600, 328, 444, 129, 132

[56] References Cited

U.S. PATENT DOCUMENTS

| | | | |
|---|---|---|---|
| 2,554,701 | 5/1951 | Hackett et al. | 51/281 |
| 3,698,408 | 10/1972 | Jacke | 134/122 |
| 3,855,441 | 12/1974 | Kimmelmann | 219/68 |
| 4,326,229 | 4/1982 | Yanagisawa | 360/135 |
| 4,593,716 | 6/1986 | Cesna | 137/561 A |

FOREIGN PATENT DOCUMENTS 56-62826  5/1981  Japan .

Primary Examiner—Bernard Pianalto
Attorney, Agent, or Firm—Francis A. Sirr; Homer L. Knearl; Richard E. Billion

[57] ABSTRACT

In a process for manufacturing a rigid magnetic recording disk, the disk's rigid substrate member is subjected to a force that produces plastic deformation in a manner so as not to remove material therefrom. In this way, the disk is provided with a surface topography that contains a controlled texture, for example in the area of the disk's start/stop track. In an embodiment of the invention, an ultrasonic probe and a disk shaped substrate member are placed in close proximity within a container that holds a fluid abrasive slurry, i.e. a suspension of hard particles in a liquid. Operation of the ultrasonic probe, as the substrate member rotates, causes the slurry to texture an adjacent portion of the substrate member by means of plastic deformation and in the absence of material removal from the substrate member. Operation of the probe thus provides texturing of the disk at an inner diameter track area thereof, for example in the disk's start/stop area. Since no material is removed from the substrate member, a step is not produced between the disk's start/stop area and the disk's outer data area. Alternate means for agitating the slurry, such as a hollow tip ultrasonic probe, a jet of slurry, and a jet of another fluid, such as an inert gas, are described.

15 Claims, 2 Drawing Sheets

TEXTURING THE SURFACE OF A RECORDING DISK USING PARTICLE IMPACT

FIELD OF THE INVENTION

This invention relates to the field of data processing, and more specifically to a method and an apparatus for use in the manufacture of rigid or hard magnetic recording disks of the type that are used in direct access storage devices (DASD), also known as disk files.

BACKGROUND OF THE INVENTION

It is known to produce controlled surface roughness in thin film magnetic recording disks in order to reduce motor starting torque relative to the rotation of the disks of a DASD unit. For example, this surface roughness is produced by a mechanical abrasive machining process, i.e. a material removal process, that textures the two planar and parallel surfaces of the disk upon which a thin film magnetic recording layer is subsequently deposited.

Generally speaking, the rigid disk shaped substrate member of a magnetic recording disk must be provided with smoothly polished, flat, surfaces in order to minimize magnetic recording layer defects, and in order to provide disk surfaces relative to which magnetic read/write heads can fly without damage occurring to either the disk or the head. However, if the disk is left with such an ultra smooth surface in the area of its start/stop track(s), the disk will likely present a high coefficient of static friction to the transducing heads.

Therefore, disk files which allow the head to come into static contact with the disk, for example in a head loading or start/stop area of the disk, generally provide a minimum level of roughness, at least at this area of the disk, in order to minimize the static friction thereof. This minimum roughness condition is currently achieved by abrasive machining, a process that results in material removal. As a result, a physical step tends to be provided between the disk's start/stop area and its data area.

A number of problems have been experienced with abrasive machine texturing. For example, small defects may occur in the disk surface, so as to interfere with head flying, or so as to cause data dropouts to occur. In addition, it is difficult to repetitively control the amount of abrasive machining that actually occurs during the texturing procedure. Cleaning of the disk substrate, after the abrasive texturing operation has been completed, is difficult to perform. Lastly, abrasive machine texturing is a relatively expensive procedure.

U.S. Pat. No. 4,326,229 describes another approach to solving this static friction problem in a magnetic recording disk for use in what is called a contact-start-stop (CSS) environment. In order to prevent adhesiveness of the disk surface, a protective layer is applied to the disk, this layer having jogs or undulations having a direction that extends transverse to the recording path, i.e. radially between the inner and outer circumference of the disk. These sinusoidal jogs are formed by surface tension that is exerted during spin coating of the protective layer.

In a preferred embodiment of the present invention an ultrasonic probe and a rigid disk substrate member, i.e. an aluminum disk, are placed in close proximity in a fluid abrasive slurry comprising a suspension of hard particles in a liquid. Energization of the probe thereafter operates to texture the substrate member, in the absence of removing material therefrom.

The use of an abrasive slurry to treat articles is generally known. U.S. Pat. Nos. 2,554,701, 3,698,408, 3,855,441 and 4,593,716 are examples.

The present invention improves the art of magnetic recording disks by providing a method and an apparatus for texturing the substrate member of a rigid magnetic recording disk, wherein the cost of the texturing process is reduced, wherein subsequent cleaning of the substrate member is simplified, wherein the texturing process is repeatable, and wherein head flying height and data dropout problems are minimized.

SUMMARY OF THE INVENTION

This invention provides a repeatable means for the topographic texturing a disk substrate member. Use of the invention provides reduced cost texturing and simplifying cleaning of the substrate member thereafter, such that data processing problems associated with flying height and data dropout are minimized.

The invention uses the energy present in the impact force of small particles to plastically deform the disk substrate member, without removing material therefrom, for example particles that are suspended in a slurry. These particles are accelerated toward the disk substrate surface, preferably by the use of an ultrasonic probe or horn. The probe is held adjacent to the surface of the disk substrate, with the slurry filling the small space between the end of the probe and the substrate surface. Ultrasonic motion of the probe tip causes the particles to impact the substrate surface, thereby dimpling the surface.

An advantage of the invention is that little if any material is removed from the substrate member during texturing thereof.

In addition, in the event that the substrate member is textured in only one annular band thereof, for example in the head loading area, the present invention does not operate to produce a step between the disk's textured head loading area and the disk's non-textured data area. The invention also finds utility when used with other texturing methods, for example to produce a texture that optimizes magnetic and mechanical properties of the disk.

These and other advantages of the invention will be apparent to those of skill in the art upon reference to the following detailed description wherein reference is made to the drawing.

DETAILED DESCRIPTION OF THE INVENTION

The present invention provides a method and an apparatus whereby the rigid substrate member of a magnetic recording disk is textured by operation of a vibration-like force that causes a suspension of particles to texture the substrate member. The resulting textured surface is free of asperities which sometimes function to interfere with head flight during data processing. In addition, there is no directionality to the texturing that is produced in accordance with the invention.

While the present invention has special utility in the texturing of an inner diameter (ID) head loading band of the disk substrate member, because operation of the invention does not produce a surface step between textured and non-textured surface areas, the spirit and scope of the invention is not to be limited thereto.

As used herein the term abrasive slurry is intended to mean a dispersion of a liquid and small, hard particles. While the mature of this slurry is not to be taken as a limitation on the spirit and scope of the invention, a preferred slurry composition comprises 15 wt. % alumina ($Al_2O_3$) of a particle size about 3 micro meters in diameter, suspended as a dispersion in an inert carrier such as water or another low viscosity liquid.

While the particle concentration and/or the viscosity of a slurry in accordance with the invention are not critical, a typical slurry comprises 15 wt. % particles in a liquid containing a dispersant and a detergent.

Other hard particles useful in the invention include tungsten carbide, diamond, silicon carbide, boron carbide, boron nitride and other suitably hard and dense particles.

Figure 1:
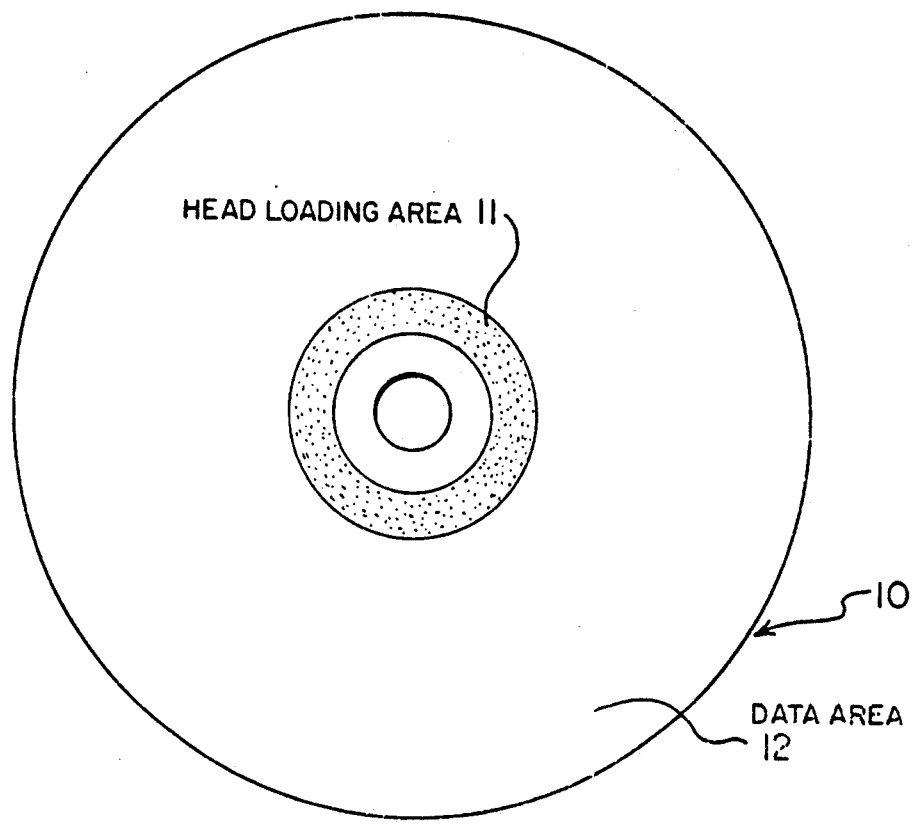
FIG. 1 is a top plan view of a rigid magnetic recording disk embodying the invention, the bottom view being identical thereto.

FIG. 1 is a plan or top view of a rigid magnetic recording disk 10 embodying the invention. While the invention may be used to texture the disk's entire planar top and bottom surfaces, here it is shown in FIG. 1 that only the disk's annular head loading area 11 is textured, leaving the disk's annular data area 12 smooth.

Figure 2:
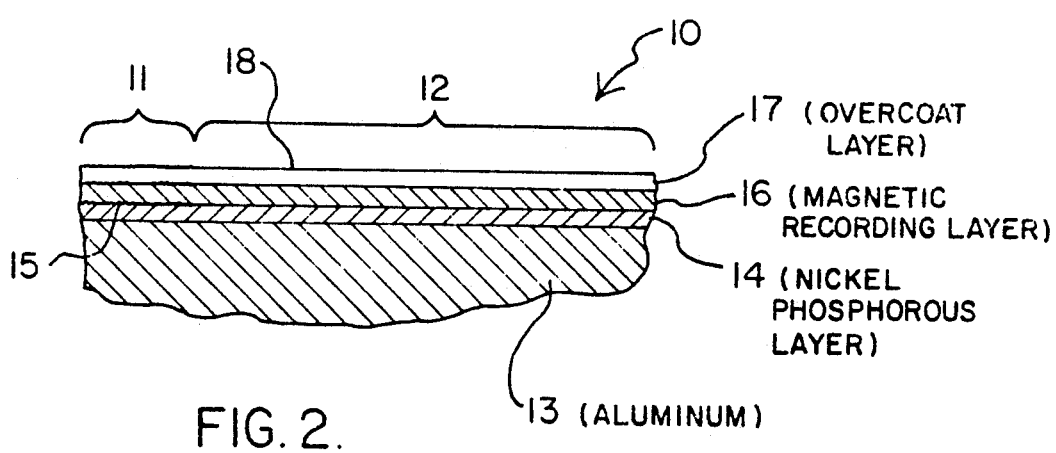
FIG. 2 is a partial side section view of the disk of FIG. 1.

FIG. 2 is a partial side section view of the disk of FIG. 1. In this view of a portion of the disk's rigid substrate member is shown at 13. Member 13 may take a variety of forms, as is well known by those of skill in the art. In accordance with the invention, substrate member 13 is a ductile or plastically deformable material, and/or may be coated with such a material.

In a preferred embodiment of the invention, but without limitation thereto, substrate 13 comprised an aluminum disk. In addition, disk 13 was plated with a nickel phosphorus (NiP) layer 14 of conventional thickness, i.e. about 10 to 20 microns thick. As is well known to those skilled in the art, during the manufacture of disk 10, the full surface area of layer(s) 14 is polished to be ultra smooth. The details of this polishing step are not critical to the invention and will not be described herein.

As will be described, and in accordance with the invention, a portion of polished substrate member 13 (in this case portion 15 of polished NiP layer 14) is subjected to impact forces that are produced by the acceleration of small particles toward portion 15, in order to plastically deform portion 15 without the removal of an appreciable amount of material therefrom.

After this texturing step has been performed, the disk is washed in a conventional manner, it being noted that the flushing away of removed material is not necessary, as it is in the case of abrasive machining.

As the last steps in the manufacture of the magnetic recording disk of FIGS. 1 and 2, a thin film magnetic recording layer 16, for example a CoPtCr alloy, and a top overcoat layer 17, for example carbon, are sequentially sputter deposited on NiP layer 14, using means well known to those skilled in the art. The disk's top surface 18 interacts with a magnetic read/write head (not shown) to form a disk/head interface. Surface 18 is conventionally coated with a lubricant.

FIG. 2 also shows a portion of the disk's head loading area 11 and data area 12, it being noted that the loading area 11 portion of surface 18 includes the topographic texturing that is provided by underlying area 15 of the substrate member. In relative terms, area 12 is ultra smooth and area 11 is rough.

Figure 3:
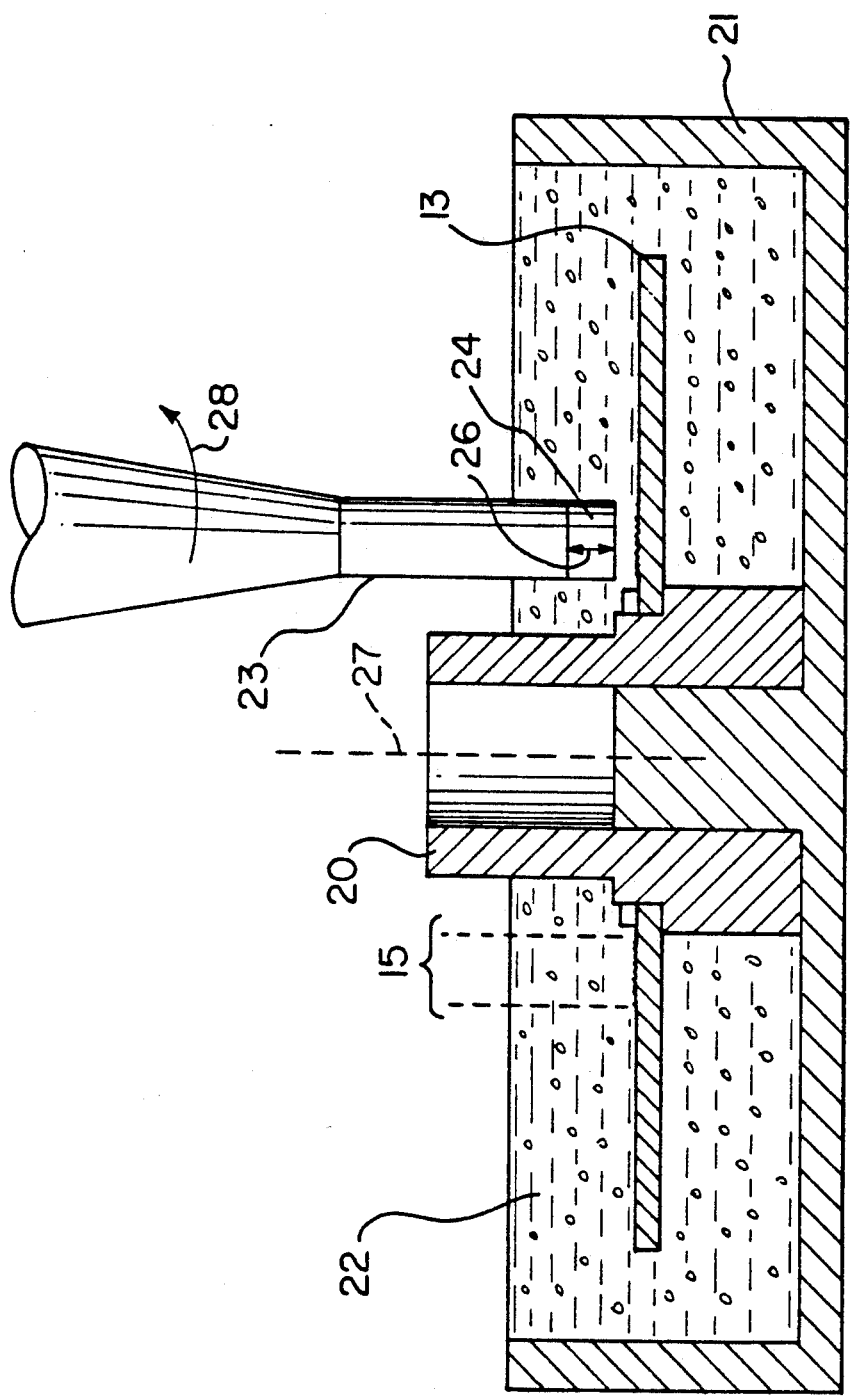
FIG. 3 is a side section view of an apparatus whereby the rigid disk substrate member of FIGS. 1 and 2 is textured in accordance with the present invention.

FIG. 3 is a side section view of an apparatus whereby rigid disk substrate member 13 of FIG. 2 is textured in an annular track area 15 in accordance with the present invention.

With reference to FIG. 3, aluminum disk shaped substrate member 13 is mounted to a rotatable, stainless steel, support hub 20 and then placed in a cup-shaped vessel 21 that contains a quantity of the above described abrasive slurry 22. For example substrate member 13 may comprise an NiP plated disk about 130 millimeters (mm) in diameter and about 75 mils thick.

An acceleration force producing member in the form of ultrasonic probe 23 is now positioned in a manner that is not critical to the invention so as to position its tip 24 closely adjacent to, but not touching the adjacent portion of annular surface area 15 of substrate member 13. For example, tip 24 may be of a round horizontal cross section, about ¼ inch in diameter. The lower end of tip 24 may be spaced an exemplary 3 mm above surface 15 of substrate member 13, for a slurry 22 having particles that are about 3 micrometers in diameter. Energization of probe 23 produces ultrasonic movement of tip 24 in the vertical direction, as is shown by arrow 26.

Alternate acceleration force means for producing acceleration of slurry 22 toward substrate area 15 will be apparent to those skilled in the art, and can include means such as a jet of liquid, for example a jet of slurry 22, a jet of an inert gas, such as air, and the use of a hollow tip ultrasonic probe, all of which alternate means operate in a like manner to accelerate, vibrate or agitate slurry 22, so as to impact the surface area 15 of substrate member 13 in a manner to produce plastic deformation thereof in the absence of the removal of an appreciable amount of material from the substrate member, and preferable with no material removal therefrom.

Note that in the embodiment of the invention shown in FIG. 3, the amount of slurry 22 that is placed within vessel 21 is such as to completely submerge both substrate member 13 and tip 24 therein.

During the texturing of area 15 of substrate member 13, the substrate member is rotated slowly about axis 27, as probe 23 is concomitantly energized in a manner well known in the art. For example, probe 23 is energized for a period of about one minute, as substrate member 13 rotates in the range of about four to six revolutions per minute. In this manner, and as is desirable in accordance with the invention, multiple passes of tip 24 over area 15 are produced.

If only ID area 15 of substrate member 13 is to be textured, probe 23 remains stationary at the position shown. If, however, the entire surface of substrate member 13 is to be textured, then probe 23 is moved slowly in a direction that is radial of substrate member 13, by the use of movement means not shown, as is indicated by arrow 28.

The manner of rotating substrate member 21 is not critical to the invention. For example, hub 20 may be rotated, or as an alternative, hub 20 may be fixed to vessel 21, and vessel 21 may be rotated.

In an embodiment of the invention, and with moderate power applied to probe 23, a NiP plated substrate member 13 was textured to an RMS roughness of about 1 micro inch in about one minute. Substrate member 13 was then sputtered coated with a carbon overcoat layer, and a fluorocarbon lubricant layer was applied to the overcoat layer. In a friction and wear test using a magnetic head, the disk was shown to have low friction properties in annular area 15, and there was no observable change in the disk, or in its friction properties after the wear test.

While the present invention has been described with reference to preferred embodiments thereof, it is appreciated that those skilled in the art will readily visualize yet other embodiments that are within the spirit and scope of the invention.

For example, and with reference to FIG. 3, substrate member 13 can be placed in a vertical position, so as to submerge only the lower portion of the disk in slurry 22. In this case, two probes 23 can be positioned in the slurry so as to simultaneously texture an annular area 15 on each side of the substrate member.

In addition, the tip 24 of probe(s) 23 can be sized so as to conform to the size of the data transducing head with which the finished disk will be used. Thus, tip 24 can be made small when the head is small.

The invention also contemplates that substrate member 13 need not be submerged in slurry 22, as above described. Rather, a hollow tip ultrasonic probe of conventional construction (not shown) may be used, with slurry 22 then being pumped through the center of this probe, to thereby texture the substrate member in the manner above described.

Since various such embodiments within the spirit and scope of the invention are apparent to those skilled in the art, it is intended that the present invention be as defined in the claims hereof.

What is claimed is:

1. A method providing nondirectional texturing of the surface of a rigid substrate member during manufacture of a rigid magnetic recording disk, comprising the steps of
    providing a rigid substrate member,
    providing a particle suspension,
    providing acceleration force means whereby said particle suspension is accelerated in a direction toward the surface to impact on said substrate member,
    producing relative movement between said substrate member and said force means generally normal to said direction, and
    energizing said force means during said relative movement in a manner to produce nondirectional plastic deformation of the surface of said substrate member by particles impacting on the surface without removal of material therefrom.

2. The method of claim 1 wherein said substrate member is immersed in said particle suspension, and wherein said acceleration force means is placed in said particle suspension at a position spaced from but adjacent to said substrate member, so as to accelerate said particle suspension against said surface.

3. The method of claim 2 wherein said force means comprises an ultrasonic probe having a tip positioned about 3 mm from said substrate member, and wherein said particle suspension includes alumina particles about 3 micrometers in diameter.

4. The method of claim 1 including the step of providing said force means from the group ultrasonic probe, air jet or fluid jet.

5. The method of claim 4 including the step of providing said substrate member as a flat disk of rigid, plastically deformable, material.

6. The method of claim 5 including the step of coating said substrate member with a NiP layer in the range of about 10 to 20 microns thick.

7. The method of claim 6 including the step of providing said force means as a jet of said particle suspension.

8. The method of claim 1 including the steps of providing a substrate member having two opposite and generally parallel surfaces, and simultaneously deforming said two opposite surfaces of said substrate member.

9. A method for nondirectionally texturing a rigid disk shaped substrate member, for use within a magnetic recording disk comprising the steps of:
    providing a slurry having hard particles therein,
    providing a ductile, disk shaped, substrate member,
    supporting said substrate member with at least a portion thereof submersed in said slurry,
    providing particle acceleration force producing means submersed in said slurry closely adjacent to, but not touching an adjacent portion of said substrate member, wherein particle in said slurry are accelerated in a direction toward said adjacent portion of said substrate member, and
    providing relative movement between said substrate member and said acceleration force producing means generally normal to said direction in a manner to produce nondirectional plastic deformation by particles impacting on said adjacent portion of said substrate member without the removal of material therefrom.

10. The method of claim 27 wherein said acceleration force producing means comprises an ultrasonic probe having a tip portion thereof positioned closely adjacent to, but not touching said adjacent portion of said substrate member.

11. The method of claim 10 wherein the tip portion of said ultrasonic probe is position about 3 mm from said adjacent surface of said substrate member, and wherein said hard particles are about 3 micrometers in diameter.

12. The method of claim 11 wherein said substrate member comprises an aluminum disk, and wherein said probe is energized for a period of about one minute, as said relative movement produces rotation of said disk at about four to six revolutions per minute.

13. The method of claim 9 wherein said acceleration force producing means comprises one of the group consisting of, a jet of said slurry, a jet of an inert gas, or an ultrasonic probe.

14. The method of claim 13 wherein said relative movement between said substrate member and said acceleration force producing means produces multiple cycles of said relative movement.

15. The method of claim 9 including the step of simultaneously deforming opposite sides of said substrate member.

* * * * *